United States Patent
Jang et al.

(10) Patent No.: US 8,373,761 B2
(45) Date of Patent: Feb. 12, 2013

(54) SHAKE CORRECTING APPARATUS AND METHOD THEREOF IN DIGITAL PHOTOGRAPHING APPARATUS

(75) Inventors: Young-soo Jang, Suwon-si (KR); Sung Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 676 days.

(21) Appl. No.: 12/632,957

(22) Filed: Dec. 8, 2009

(65) Prior Publication Data

US 2010/0149352 A1    Jun. 17, 2010

(30) Foreign Application Priority Data

Dec. 11, 2008  (KR) .................. 10-2008-0125963

(51) Int. Cl.
*H04N 5/228*  (2006.01)
(52) U.S. Cl. .............. 348/208.4; 348/208.99; 348/208.5
(58) Field of Classification Search .................. None
See application file for complete search history.

(56) References Cited

U.S. PATENT DOCUMENTS

| | | | | |
|---|---|---|---|---|
| 5,982,421 A * | 11/1999 | Inou et al. ................. | 348/208.5 |
| 6,650,361 B1 * | 11/2003 | Shiomi ..................... | 348/218.1 |
| 2006/0033817 A1 * | 2/2006 | Ishikawa et al. ........... | 348/208.2 |
| 2006/0170784 A1 * | 8/2006 | Clarke et al. ............. | 348/208.99 |
| 2007/0196086 A1 * | 8/2007 | Ishikawa .................. | 396/55 |

FOREIGN PATENT DOCUMENTS

| | | |
|---|---|---|
| JP | 2005-203861 A | 7/2005 |
| KR | 1998-0024873 A | 7/1998 |
| KR | 1020070080223 A | 8/2007 |
| KR | 1020080037571 A | 4/2008 |

* cited by examiner

*Primary Examiner* — Justin P Misleh
(74) *Attorney, Agent, or Firm* — Drinker Biddle & Reath LLP

(57) ABSTRACT

Provided are a method and apparatus for correcting a shake of a digital photographing apparatus. The method includes sensing a shake via an inertial sensor comprised in the digital photographing apparatus, and calculating a first shake value; comparing the first shake value with a predetermined threshold value and, when the first shake value is greater than the predetermined threshold value, driving an OIS (optical image stabilizer); detecting an edge component of an image of a target subject, wherein the image is input via an imaging device of the digital photographing apparatus, and calculating a second shake value from a difference value between edge values of sequential frames of the input image; and comparing the second shake value with the first shake value, and according to a result of the comparing, controlling a shake of the target subject to be corrected.

20 Claims, 4 Drawing Sheets

SHAKE CORRECTING APPARATUS AND METHOD THEREOF IN DIGITAL PHOTOGRAPHING APPARATUS

CROSS-REFERENCE TO RELATED PATENT APPLICATION

This application claims the benefit of Korean Patent Application No. 10-2008-0125963, filed on Dec. 11, 2008 in the Korean Intellectual Property Office, the entire contents of which is incorporated herein in by reference.

BACKGROUND OF THE INVENTION

1. Field of the Invention

The present invention relates to a digital photographing apparatus, and more particularly, to an apparatus and method for correcting a shake of a digital photographing apparatus.

2. Description of the Related Art

When a subject is photographed by a digital image processing apparatus, movement, such as a shake of a hand or body by the user, may make the image appear unclear and blurry. The quality of the digital photographing apparatus is often measured by the quality of the images photographed by the digital image processing apparatus, and images that appear unclear and blurry are often regarded as having a low quality.

SUMMARY OF THE INVENTION

The present invention provides a shake correcting apparatus and a method thereof in a digital photographing apparatus, whereby a hand-shake correcting member is driven with respect to a shake that occurs when the digital photographing apparatus is gripped, and with respect to a shake of a target subject, the shake of the target subject is corrected by using target subject information entered in real-time via an imaging surface.

The present invention also provides a recording medium having recorded thereon a program for executing the method using a computer.

According to an aspect of the present invention, there is provided a method of correcting a shake of a digital photographing apparatus, the method including the operations of sensing a shake via an inertial sensor comprised in the digital photographing apparatus, and calculating a first shake value; comparing the first shake value with a predetermined threshold value and, when the first shake value is greater than the predetermined threshold value, driving an optical image stabilizer (OIS); detecting an edge component of an image of a target subject, wherein the image is input via an imaging device of the digital photographing apparatus, and calculating a second shake value from a difference value between edge values of sequential frames of the input image; and comparing the second shake value with the first shake value, and according to a result of the comparing, controlling a shake of the target subject to be corrected.

When the second shake value is greater than the first shake value, the method may further include the operation of driving the OIS so as to correct the shake of the target subject according to the second shake value.

When the second shake value is greater than the first shake value, the method may further include the operation of correcting the shake of the target subject based on the input image according to the second shake value.

When the second shake value is less than the first shake value, the method may further include the operation of driving the OIS so as to correct the shake of the target subject according to the first shake value.

When the second shake value is less than the first shake value, the method may further include the operation of correcting the shake of the target subject based on the input image according to the first shake value.

The OIS may include a lens or an imaging device.

The image may be a target subject image that is input during an exposure time period of the imaging device of the digital photographing apparatus.

The inertial sensor may include one of an acceleration sensor, an angular sensor, an angular acceleration sensor, and an impulse sensor.

The shake of the target subject may be corrected by selecting an intermediate frame image from among sequential frames of the input image according to the second shake value or the first shake value.

The shake of the target subject may be corrected by composing images respectively obtained via a high International Organization for Standardization (ISO) value and a low ISO value according to the second shake value or the first shake value.

According to another aspect of the present invention, there is provided a shake correcting apparatus of a digital photographing apparatus, the shake correcting apparatus including a first shake calculating unit for sensing a shake via an inertial sensor comprised in the digital photographing apparatus, and calculating a first shake value; an edge detecting unit for detecting an edge component of an image of a target subject, wherein the image is input via an imaging device of the digital photographing apparatus; a second shake calculating unit for calculating a second shake value from a difference value between edge values of sequential frames of the input image; and a control unit for comparing the first shake value with a predetermined threshold value and, when the first shake value is greater than the predetermined threshold value, driving an OIS, and for comparing the second shake value with the first shake value, and according to a result of the comparing, controlling a shake of the target subject to be corrected.

When the second shake value is greater than the first shake value, the control unit may drive the OIS so as to correct the shake of the target subject according to the second shake value.

The shake correcting apparatus may further include an image correcting unit for correcting the shake of the target subject based on the input image according to the second shake value when the second shake value is greater than the first shake value.

When the second shake value is less than the first shake value, the control unit may drive the OIS so as to correct the shake of the target subject according to the first shake value.

The shake correcting apparatus may further include an image correcting unit for correcting the shake of the target subject based on the input image according to the first shake value when the second shake value is less than the first shake value.

The OIS may include a lens or an imaging device.

The control unit may control an optical driving unit or an imaging device control unit so as to drive the lens or the imaging device.

The inertial sensor may include one of an acceleration sensor, an angular sensor, an angular acceleration sensor, and an impulse sensor. The image correcting unit may correct the shake of the target subject by selecting an intermediate frame image from among sequential frames of the input image according to the second shake value or the first shake value or by composing images respectively obtained via a high ISO (International Organization for Standardization) value and a low ISO value according to the second shake value or the first shake value.

According to another aspect of the present invention, there is provided a computer readable recording medium having recorded thereon a program for executing the method on a computer.

BRIEF DESCRIPTION OF THE DRAWINGS

The above and other features and advantages of the present disclosure will become more apparent by describing in detail exemplary embodiments thereof with reference to the attached drawings in which.

DETAILED DESCRIPTION OF THE INVENTION

Therefore there is a need in the art for a method of and apparatus for correcting shakes when capturing an image with a digital photographing apparatus. The method and apparatus may correct for both hand-shake of a user of the apparatus and for when a target subject moves during a light exposure time. The method includes sensing a shake via an inertial sensor comprised in the digital photographing apparatus, and calculating a first shake value; comparing the first shake value with a predetermined threshold value and, when the first shake value is greater than the predetermined threshold value, driving an OIS (optical image stabilizer); detecting an edge component of an image of a target subject, wherein the image is input via an imaging device of the digital photographing apparatus, and calculating a second shake value from a difference value between edge values of sequential frames of the input image; and comparing the second shake value with the first shake value, and according to a result of the comparing, controlling a shake of the target subject to be corrected.

Figure 1:
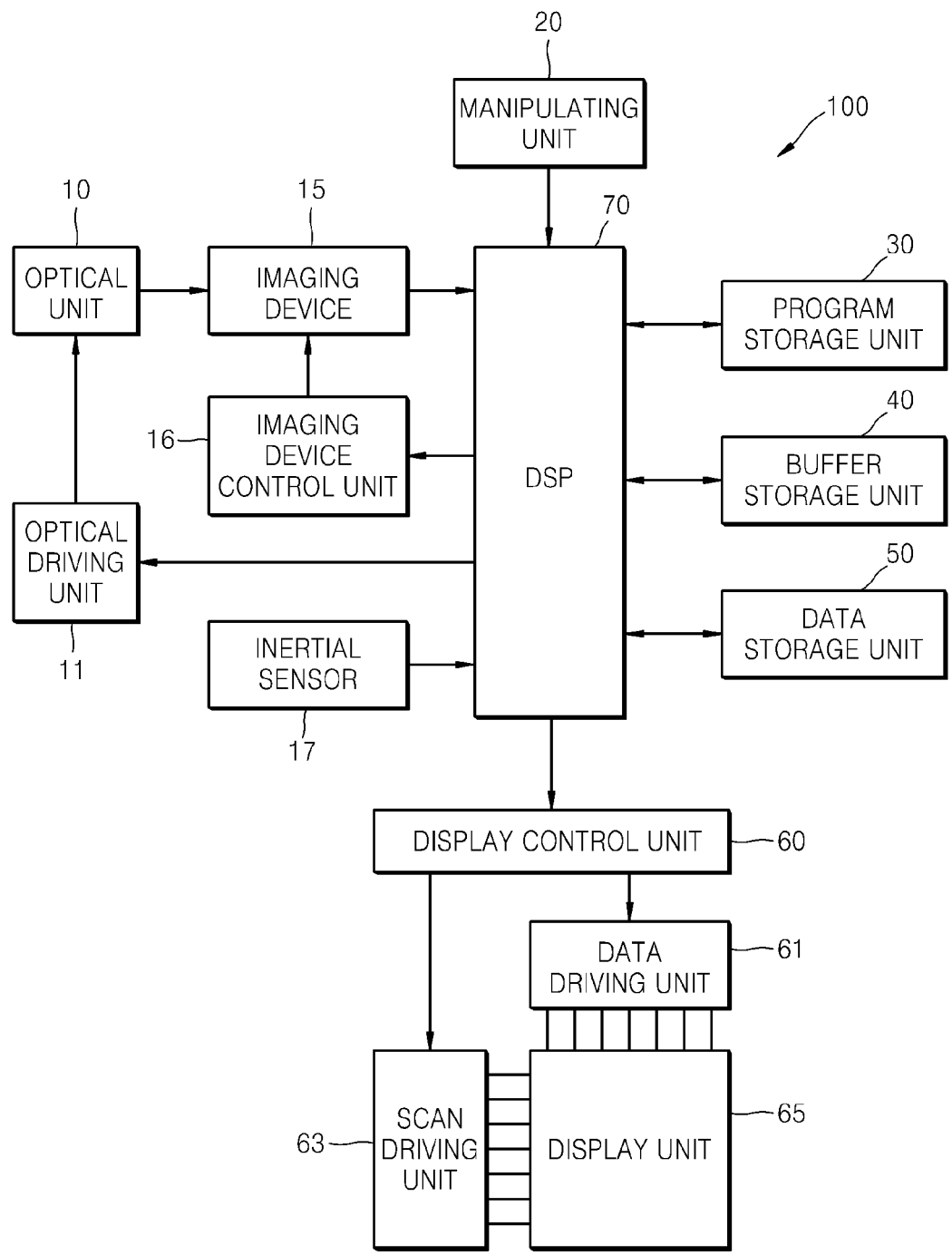
FIG. 1 is a block diagram of an example of a digital photographing apparatus.
Figure 2:
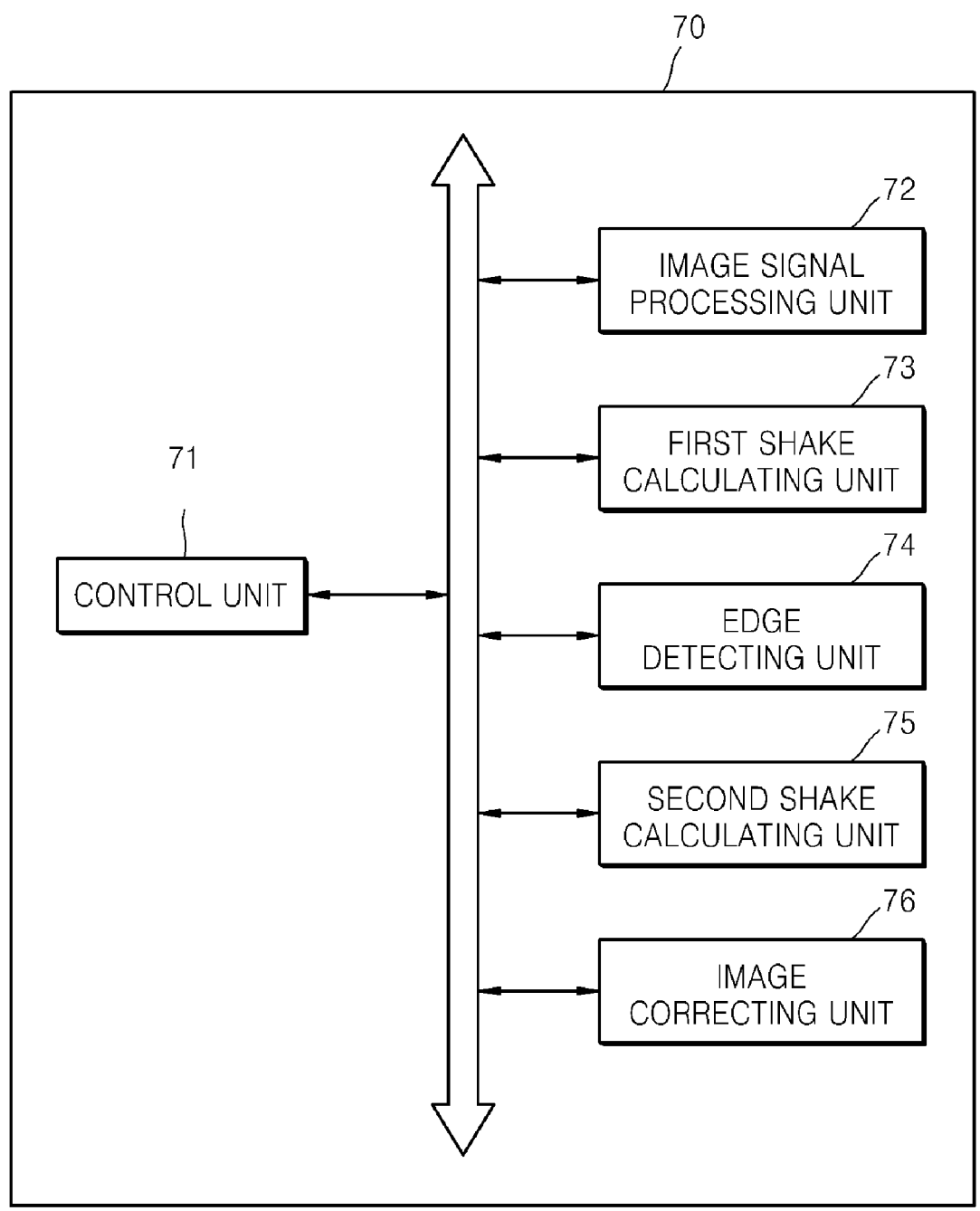
FIG. 2 is a block diagram of an example of a digital signal processing (DSP) unit of the digital photographing apparatus of FIG. 1.

Hereinafter, the present disclosure will be described in detail by explaining exemplary embodiments of the invention with reference to the attached drawings. In the following description, some well-known functions or constructions may not be described in detail since they would obscure the disclosure with unnecessary detail FIG. 1 is a block diagram of a digital photographing apparatus 100 according to an embodiment of the present invention. FIG. 2 is a block diagram of a digital signal processing (DSP) unit 70 of the digital photographing apparatus 100 of FIG. 1.

Referring to FIG. 1, the digital photographing apparatus 100 includes an optical unit 10, an optical driving unit 11, an imaging device 15, an imaging device control unit 16, an inertial sensor 17, a manipulating unit 20, a program storage unit 30, a buffer storage unit 40, a data storage unit 50, a display control unit 60, a data driving unit 61, a scan driving unit 63, a display unit 65 and the DSP unit 70.

The optical unit 10 receives an optical signal corresponding to a target subject and provides the optical signal to the imaging device 15. The optical unit 10 may include at least a lens from among a zoom lens, for controlling an angle of view to be small or large according to a focal length, and a focus lens, for adjusting a focus on the target subject. Also, the optical unit 10 may further include an aperture for adjusting an amount of light. In the present embodiment of FIG. 1, the optical unit 10 may further include a correcting lens for performing correction in correspondence to a shake of a camera.

Examples of the functions of the optical driving unit 11 include, but are not limited to, adjusting a position of a lens and opening and closing the aperture. The optical driving unit 11 may adjust focus by moving the position of the lens and also may adjust an amount of light by controlling the opening and closing of the aperture. The optical driving unit 11 may control the optical unit 10, according to a control signal that is automatically generated in response to an image signal input in real-time or a control signal that is manually input by user manipulation, the optical driving unit 11 may control the optical unit 10.

The optical driving unit 11 may be controlled by the DSP unit 70 as illustrated in FIG. 2, thereby moving the position of the lens of the optical unit 10 according to a driving signal for adjusting the position of the lens according to a shake direction and a shake degree.

The optical signal passing through the optical unit 10 reaches a light-receiving surface of the imaging device 15 and forms an image of the target subject. The imaging device 15 may be a charge coupled device (CCD) or a complementary metal oxide semiconductor image sensor (CIS), which transforms an optical signal into an electrical signal. Sensitivity of the imaging device 15 may be adjusted by the imaging device control unit 16. The imaging device control unit 16 may control the imaging device 15 according to the control signal that is automatically generated in response to the real-time image signal input or the control signal that is manually input by the user manipulation. The imaging device 15 may be an optical image stabilizer (OIS), and according to a signal from the DSP unit 70, the imaging device control unit 16 may move the position of the imaging device 15 according to a shake direction or a shake degree, and thus may correct a shake.

The inertial sensor 17 of the digital photographing apparatus 100 senses movement, such as a hand-shake occurred due to a grip of a user, and provides a sense signal to the DSP unit 70. The inertial sensor 17 may include, but is not limited to, an acceleration sensor, an angular sensor, an angular acceleration sensor, and an impulse sensor. The acceleration sensor, the angular sensor, the angular acceleration sensor, or the impulse sensor respectively sense acceleration, angular velocity, angular acceleration or an amount of impulse with respect to one or more axes with respect to the optical unit 10 of the digital photographing apparatus 100, that is, with respect to one or more axes from among a first axis of front and rear directions, a second axis of left and right directions, and a third axis of up and down directions. For example, the acceleration sensor quickly senses a dynamic force such as an acceleration force, a vibration force, and an impulse force that are applied to a subject, and the angular sensor, which is referred to as a gyrosensor, senses the angular velocity by using a vibrating crystal sound fork.

The manipulating unit 20 is a unit for inputting an external control signal from, for example, a user. The manipulating unit 20 includes a shutter-release button for generating a shutter-release signal for exposing the imaging device 15 to light for a predetermined time period in order to photograph an image, a power button for powering on/off the digital photographing apparatus 100, a wide-angle zoom button and telescopic zoom button for widening and narrowing an angle of view according to user manipulation, and various function buttons for selecting a mode from among a text input mode, a photographing mode and a reproducing mode, a white balance setting mode, an exposure setting mode, and the like. Also, in embodiments, a user may select a movement correcting mode or a hand-shake preventing mode by using the manipulating unit 20, and thus may correct movement of the digital photographing apparatus 100 or movement of the target subject.

The manipulating unit 20 may have various buttons as described above but is not limited thereto. Thus, examples of the manipulating unit 20 include, but are not limited to, a keyboard, a touchpad, a touch screen, a remote controller, and the like.

Also, the digital photographing apparatus 100 includes the program storage unit 30 for storing programs, such as an operation system for driving the digital photographing apparatus 100 and an application system, the buffer storage unit 40 for temporarily storing data necessary for performing calculations and result data, and the data storage unit 50 for storing image files containing image signals and various types of information that is necessary for the programs.

In addition, the digital photographing apparatus 100 includes the display control unit 60 for controlling displaying of image information photographed by the digital photographing apparatus 100, the data driving unit 61 for delivering display data input from the display control unit 60, the scan driving unit 63, and the display unit 65 for displaying a predetermined image according to signals input from the data driving unit 61 and the scan driving unit 63. Examples of the display unit 65 include, but are not limited to, a liquid crystal display (LCD) panel, an organic light emitting diode (OLED) panel, and an electrophoretic display (EPD) panel.

The digital photographing apparatus 100 includes the DSP unit 70 for processing an input image signal and controlling each of the aforementioned units according to the input image signal or to an externally input signal.

The DSP unit 70 will be described with reference to FIG. 2.

Referring to FIG. 2, the DSP unit 70 includes a control unit 71, an image signal processing unit 72, a first shake calculating unit 73, an edge detecting unit 74, a second shake calculating unit 75, and an image correcting unit 76. The DSP unit 70 may be a shake correcting apparatus.

The control unit 71 controls general operations of the DSP unit 70.

The image signal processing unit 72 transforms an image signal inputted from the imaging device 15 into a digital signal, and performs image signal processing, such as Gamma correction, color filter array interpolation, color matrix, color correction, color enhancement, and the like, for transforming the image signal in accordance with human perception. Also the image signal processing unit 72 may perform an auto white balance algorithm or an auto exposure algorithm when functions corresponding to these algorithms are set. The image signal processing unit 72 may also adjust data image size by using a scaler, and compressing the image data, thereby forming an image file having a predetermined format. Additionally, the image signal processing unit 72 may decompress an image file. The image signal processing unit 72 may perform the image signal processing with respect to an image signal that is inputted in real-time at a live-view mode before photographing is performed, and with respect to an image signal that is generated by a shutter-release signal. At this time, image signal processing may be performed on each of the image signals.

The first shake calculating unit 73 detects a shake via the inertial sensor 17 included in the digital photographing apparatus 100, thereby calculating a first shake value. The first shake calculating unit 73 may calculate a first shake value by using at least one of statistics including a standard deviation, a variance, an average, a maximum value, a minimum value, and a norm that are calculated during a predetermined time period in which the first shake calculating unit 73 receives a signal indicating movement with respect to at least one axis among a first axis through a third axis of the digital photographing apparatus 100. In embodiments, the first shake calculating unit 73 differentiates or integrates at least once the differentiated or integrated signal indicating the movement with respect to at least one axis among the first axis through the third axis of the digital photographing apparatus 100, and then may calculate the first shake value by using at least one of statistics including the standard deviation, the variance, the average, the maximum value, the minimum value, and the norm. The first shake value may be generated in response to a shake of the digital photographing apparatus 100, e.g., by a hand-shake occurred due to grip of a user.

The control unit 71 compares the first shake value, which is calculated by the first shake calculating unit 73, with a threshold value, and controls the OIS to be driven when the first shake value is greater than the threshold value. In embodiments, the OIS changes a path of light by moving a lens included in the optical unit 10 or the imaging device 15, e.g., a CCD, according to the first shake value, and thus corrects an image that is incorrectly formed due to a shake. The control unit 71 drives the OIS by outputting a control signal in accordance with the first shake value to the optical driving unit 11 for driving the optical unit 10 or to the imaging device control unit 16 for driving the imaging device 15. Also, in embodiments, when the first shake value is less than the threshold value, the control unit 71 does not drive the OIS. The threshold value may vary based on sensitivity settings with respect to the shake of the digital photographing apparatus 100. The threshold value may be based on a user setting(s).

The edge detecting unit 74 detects an edge component of a target subject image input via the imaging device 15 of the digital photographing apparatus 100. After the movement of the digital photographing apparatus 100 is corrected, the edge component of a target subject image input via the imaging device 15 during an exposure time period may be detected. In embodiments, the input image may be an image that has undergone predetermined image signal processing performed by the image signal processing unit 72. In embodiments, the detection of the edge component of the image is performed by allowing each image signal to pass through a high pass filter (HPF), wherein the image signals are with respect to frames constituting the image. In embodiments, a high frequency component, that is, the edge component of the image signal is detected by allowing the image signal to pass through the HPF. However, the types of edge detecting filters are not limited thereto and thus, a Laplacian filter, a Sobel filter, and other methods may be used to detect the edge component.

The second shake calculating unit 75 calculates a second shake value from a difference value between edge values of sequential frames of the input image. Here, the sequential frames indicate previous and next frames, that is, a frame at a specific point of view and a next frame. The second shake calculating unit 75 may calculate the second shake value from the difference value between the edge values of the sequential frames and thus may perform a shake correction with respect to a shake of the target subject.

The control unit 71 compares the second shake value calculated by the second shake calculating unit 75 with the first shake value calculated by the first shake calculating unit 73, and according to a result of the comparison, the control unit 71 controls the shake of the target subject to be corrected. In embodiments, when the second shake value is greater than the first shake value, the control unit 71 drives the OIS so that the shake of the target subject is corrected according to the second shake value. In embodiments, when the shake of the target subject is greater than the shake of the digital photographing apparatus 100, the OIS is driven to correct the shake of the target subject according to the shake of the target subject, which may be the second shake value. Also, in embodiments, in order to correct the shake of the target subject according to the second shake value, the control unit 71 controls the shake of the target subject to be corrected via a digital image stabilizer (DIS) for correcting a shake of the target subject based on an input image. The DIS will be described below along with the image correcting unit 76.

Also, when the second shake value is less than the first shake value, the control unit 71 drives the OIS so as to correct the shake of the target subject according to the first shake value, or controls the shake of the target subject to be corrected via the DIS for correcting the shake of the target subject based on the input image.

In embodiments, the image correcting unit 76 corrects the shake by using the DIS. Here, the DIS may use various image processing methods. For example, the DIS may apply a method of selecting an intermediate frame image that is from among sequentially photographed frames and that is selected according to a shake value level, or the DIS may apply a method of composing images obtained using a high International Organization for Standardization (ISO) value and a low ISO value. The ISO method is an image correcting method where an image is automatically photographed twice while changing International Organization for Standardization (ISO) values. For example, the method may include composing an image (shape information about a target subject) that is stably photographed at a high ISO value, and an image (color information) that has a small noise at a low ISO value. The DIS may use other methods.

In embodiments, according to a control signal from the control unit 71, the image correcting unit 76 corrects the shake of the target subject according to the first shake value or the second shake value. The first shake value and the second shake value may provide a standard to select the intermediate frame image and may be a standard for adjustment of ISO sensitivity. The DIS is explained in relation to the selection of the intermediate frame image and the adjustment of the ISO sensitivity but in embodiments other methods may be used.

Figure 3:
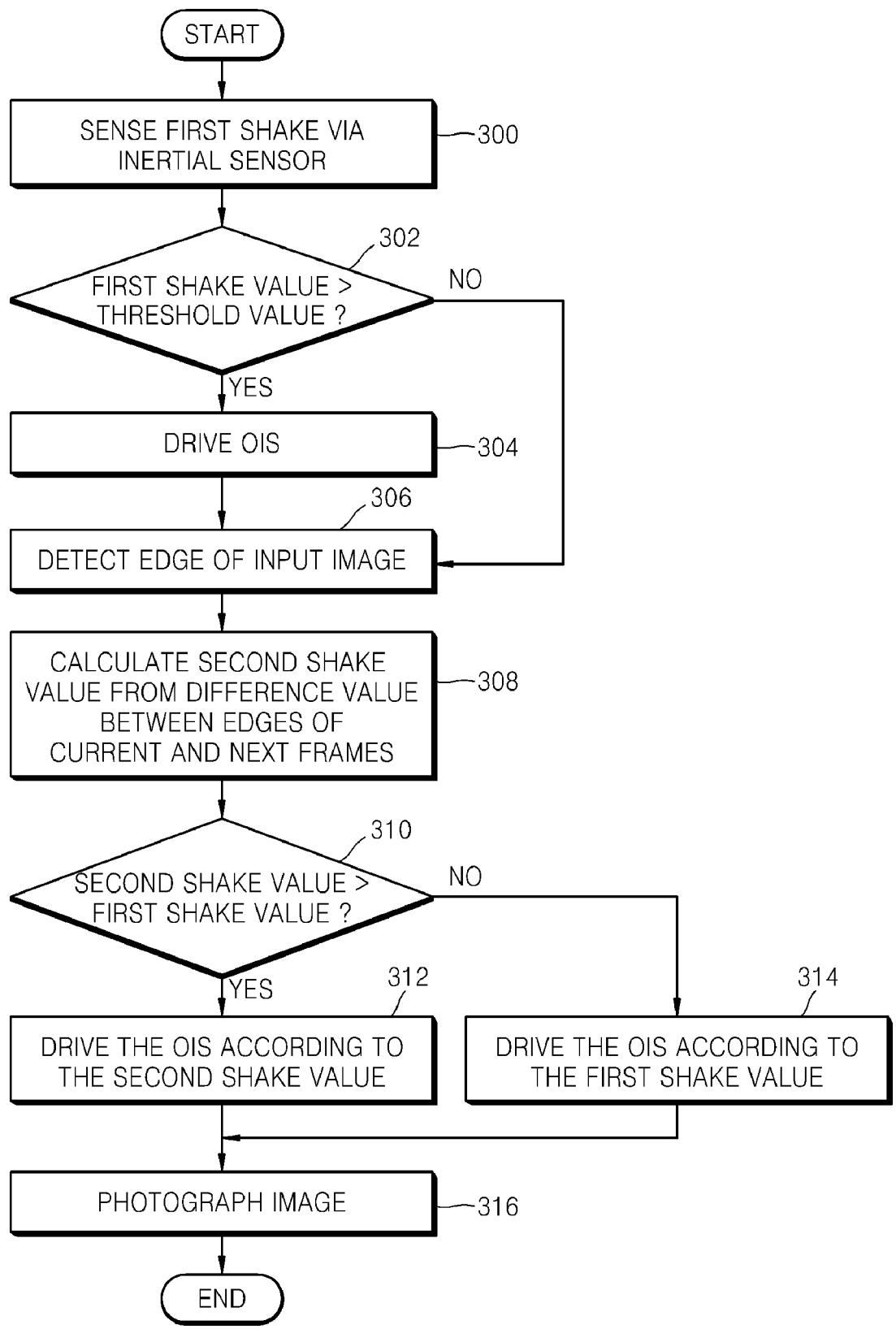
FIG. 3 is a flowchart of an example of a method of correcting a shake of a digital photographing apparatus.

FIG. 3 is a flowchart of an example of a method of correcting a shake of a digital photographing apparatus.

Referring to FIG. 3, in operation 300, a first shake is sensed via an inertial sensor. The first shake is a movement of the digital photographing apparatus. In operation 302, a value of the first shake (hereinafter, referred to as a 'first shake value') is compared to a predetermined threshold value. As a result of the comparison in operation 302, when the first shake value is greater than the threshold value, the method proceeds to operation 304 in which an OIS is driven. When the first shake value is less than the threshold value, the method proceeds to operation 306 in which an edge of an input image is detected. In operation 308, a second shake value is determined from a difference between values of edges of current and next frames. In embodiments, the second shake value indicates a shake value of a target subject, which may indicate that the subject moved during the exposure time period when the image was captured, where the shake value is calculated from input via an imaging device during an exposure time period. In operation 310, the second shake value is compared with the first shake value, and, when the second shake value is greater than the first shake value, the method proceeds to operation 312 in which the OIS is driven according to the second shake value. In operation 310, when the second shake value is less than the first shake value, the method proceeds to operation 314 in which the OIS is driven according to the first shake value.

In operation 316, an image is photographed.

Figure 4:
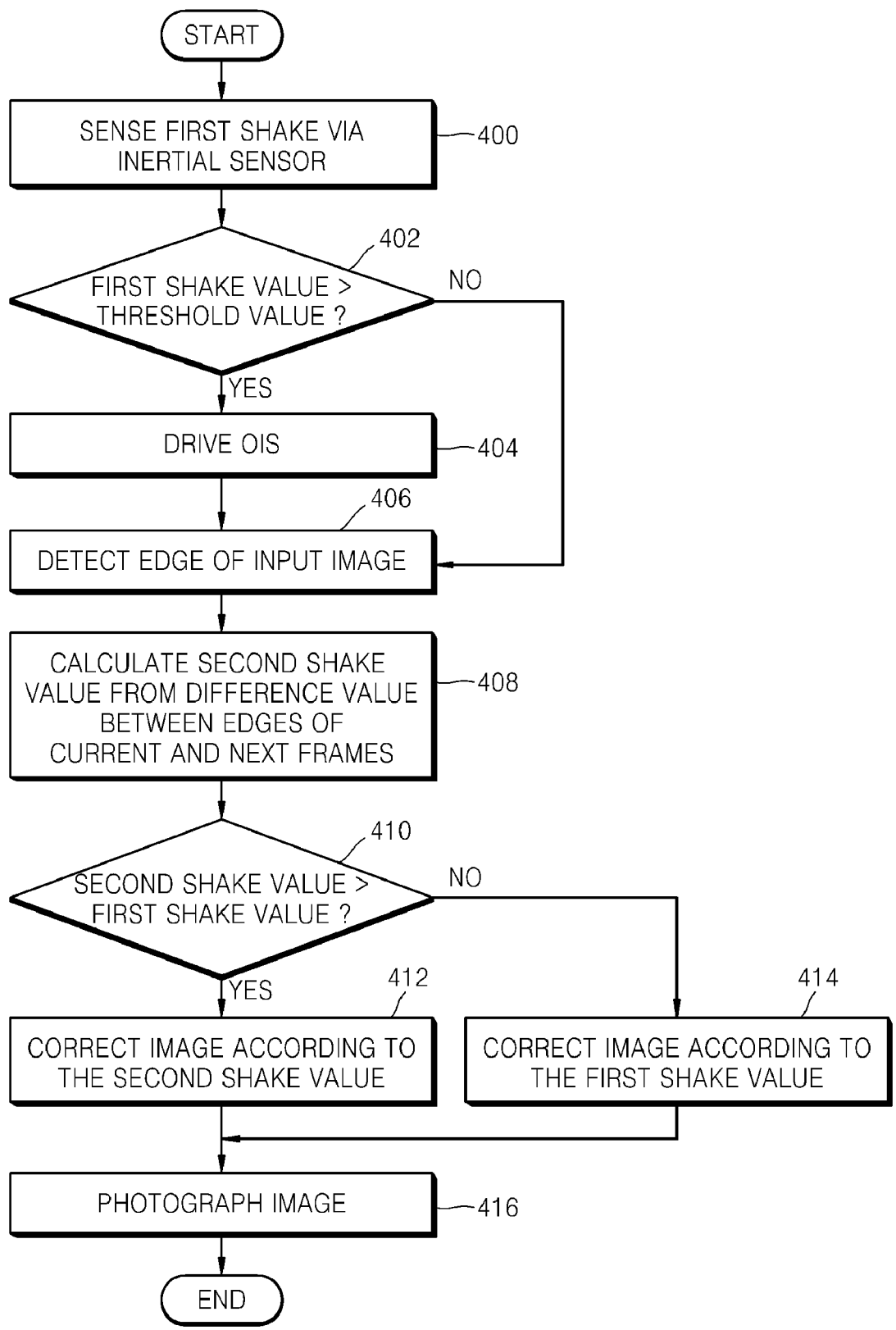
FIG. 4 is a flowchart of an example of a method of correcting a shake of a digital photographing apparatus.

FIG. 4 is a flowchart of a method of correcting a shake of a digital photographing apparatus, according to another embodiment of the present invention.

Referring to FIG. 4, in operation 400, a first shake is sensed via an inertial sensor. Here, the first shake is a movement of the digital photographing apparatus. In operation 402, a value of the first shake (hereinafter, referred to as a 'first shake value') is compared to a predetermined threshold value. As a result of the comparison in operation 402, when the first shake value is greater than the threshold value, the method proceeds to operation 404 in which an OIS is driven. When the first shake value is less than the threshold value, the method proceeds to operation 406 in which an edge of an input image is detected. In operation 408, a second shake value is determined from a difference between values of edges of current and next frames. Here, the second shake value indicates a shake value of a target subject, where the shake value is input via an imaging device during an exposure time period. In operation 410, the second shake value is compared with the first shake value, and, when the second shake value is greater than the first shake value, the method proceeds to operation 412 in which a DIS is driven to correct the shake of the target subject according to the second shake value. In operation 410, when the second shake value is less than the first shake value, the method proceeds to operation 414 in which the DIS is driven to correct the shake of the target subject according to the first shake value. In operation 416, an image is photographed.

The method of correcting the shake of the digital photographing apparatus according to the one or more embodiments of the present invention drives the OIS according to a shake due to that the digital photographing apparatus is gripped. However, with respect to the shake of the target subject, the method analyzes real-time target subject information input on an imaging surface, and then corrects the shake of the target subject via the OIS or the DIS, thereby photographing a stabilized image in which the target subject is centred.

The one or more embodiments are described with reference to a digital camera to which the one or more embodiments of the present invention may be applied but the one or more embodiments are not limited thereto. Therefore, it will be understood by those of ordinary skill in the art that the disclosed embodiments may be applied to other image capturing devices. Examples of other image capturing device where the disclosed embodiments may be applied, include, but are not limited to a phone having a camera function, a personal digital assistant (PDA), and a portable multimedia player (PMP).

The invention can also be embodied as computer readable codes on a computer readable recording medium. The computer readable recording medium is any data storage device that can store programs or data that can be thereafter read by a computer system.

Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion.

The various illustrative units, logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of instructions on a machine readable medium and/or computer readable medium.

While this invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation.

What is claimed is:

1. A method of correcting a shake of a digital photographing apparatus, the method comprising:
   sensing a shake via an inertial sensor comprised in the digital photographing apparatus, and calculating a first shake value;
   comparing the first shake value with a predetermined threshold value and, when the first shake value is greater than the predetermined threshold value, driving an OIS (optical image stabilizer);
   detecting an edge component of an image of a target subject, wherein the image is input via an imaging device of the digital photographing apparatus, and calculating a second shake value from a difference value between edge values of sequential frames of the input image; and
   comparing the second shake value with the first shake value, and according to a result of the comparing, controlling a shake of the target subject to be corrected.

2. The method of claim 1, when the second shake value is greater than the first shake value, further comprising driving the OIS so as to correct the shake of the target subject according to the second shake value.

3. The method of claim 1, when the second shake value is greater than the first shake value, further comprising correcting the shake of the target subject based on the input image according to the second shake value.

4. The method of claim 1, when the second shake value is less than the first shake value, further comprising driving the OIS so as to correct the shake of the target subject according to the first shake value.

5. The method of claim 1, when the second shake value is less than the first shake value, further comprising correcting the shake of the target subject based on the input image according to the first shake value.

6. The method of claim 1, wherein the OIS comprises a lens or an imaging device.

7. The method of claim 1, wherein the image is a target subject image input during an exposure time period of the imaging device of the digital photographing apparatus.

8. The method of claims 1, wherein the shake of the target subject is corrected by selecting an intermediate frame image from among sequential frames of the input image according to the second shake value or the first shake value.

9. The method of claim 1, wherein the shake of the target subject is corrected by composing images respectively obtained via a high ISO (International Organization for Standardization) value and a low ISO value according to the second shake value or the first shake value.

10. A computer program product, comprising:
    a computer-readable medium comprising:
    a first set of codes for causing a computer to sense a shake via an inertial sensor comprised in the digital photographing apparatus, and calculating a first shake value;
    a second set of codes for causing a computer to compare the first shake value with a predetermined threshold value and, when the first shake value is greater than the predetermined threshold value, driving an OIS (optical image stabilizer);
    a third set of codes for causing a computer to detect an edge component of an image of a target subject, wherein the image is input via an imaging device of the digital photographing apparatus, and calculating a second shake value from a difference value between edge values of sequential frames of the input image; and
    a forth set of codes for causing a computer to compare the second shake value with the first shake value, and according to a result of the comparing, controlling a shake of the target subject to be corrected.

11. A shake correcting apparatus of a digital photographing apparatus, the shake correcting apparatus comprising:
    a first shake calculating unit configured to sense a shake via an inertial sensor comprised in the digital photographing apparatus, and to calculate a first shake value;
    an edge detecting unit for configured to detect an edge component of an image of a target subject, wherein the image is input via an imaging device of the digital photographing apparatus;
    a second shake calculating unit configured to calculate a second shake value from a difference value between edge values of sequential frames of the input image; and
    a control unit configured to compare the first shake value with a predetermined threshold value and, when the first shake value is greater than the predetermined threshold value, driving an OIS (optical image stabilizer), and configured to compare the second shake value with the first shake value, and according to a result of the comparing, to control a shake of the target subject to be corrected.

12. The shake correcting apparatus of claim 11, wherein, when the second shake value is greater than the first shake value, the control unit is configured to drive the OIS so as to correct the shake of the target subject according to the second shake value.

13. The shake correcting apparatus of claim 11, further comprising an image correcting unit configured to correct the shake of the target subject based on the input image according to the second shake value when the second shake value is greater than the first shake value.

14. The shake correcting apparatus of claim 11, wherein, when the second shake value is less than the first shake value, the control unit is configured to drive the OIS so as to correct the shake of the target subject according to the first shake value.

15. The shake correcting apparatus of claim 11, further comprising an image correcting unit configured to correct the shake of the target subject based on the input image according to the first shake value when the second shake value is less than the first shake value.

16. The shake correcting apparatus of claim 11, wherein the OIS comprises a lens or an imaging device.

17. The shake correcting apparatus of claim 16, wherein the control unit controls at least one of an optical driving unit or an imaging device control unit so as to drive the lens or the imaging device.

18. The shake correcting apparatus of claim 11, wherein the inertial sensor includes at least one of an acceleration sensor, an angular sensor, an angular acceleration sensor, and an impulse sensor.

19. The shake correcting apparatus of claim 11, wherein the image correcting unit is configured to correct the shake of the target subject by selecting an intermediate frame image from among sequential frames of the input image according to one of the second shake value or the first shake value.

20. The shake correcting apparatus of claim 11, wherein the image correcting unit is configured to correct the shake of the target subject by composing images respectively obtained via a high ISO (International Organization for Standardization) value and a low ISO value according to the second shake value or the first shake value.

* * * * *